US009921790B2

(12) United States Patent
Anand et al.

(10) Patent No.: US 9,921,790 B2
(45) Date of Patent: Mar. 20, 2018

(54) DEVICE MESSAGING FOR PROCESSING JOBS OVER A NETWORK

(71) Applicant: Hewlett-Packard Development Company, L.P., Houston, TX (US)

(72) Inventors: Pankaj Anand, New Delhi (IN); Laurent Pizot, Camas, WA (US); Pankaj Sharma, New Delhi (IN); Jacob Refstrup, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/679,936

(22) Filed: Apr. 6, 2015

(65) Prior Publication Data

US 2015/0212779 A1    Jul. 30, 2015

Related U.S. Application Data (63) Continuation of application No. 13/636,361, filed as application No. PCT/US2010/030220 on Apr. 7, 2010, now Pat. No. 9,019,532.

(51) Int. Cl.
*G06F 3/12* (2006.01)
*H04L 29/08* (2006.01)
(Continued)

(52) U.S. Cl.
CPC .......... *G06F 3/1268* (2013.01); *G06F 3/1286* (2013.01); *G06F 9/546* (2013.01);
(Continued)

(58) Field of Classification Search
CPC .................................................. G06F 3/1268
See application file for complete search history.

(56) References Cited

U.S. PATENT DOCUMENTS 5,287,194 A * 2/1994 Lobiondo .......... G03G 15/5083
358/1.15
5,903,716 A * 5/1999 Kimber ................. G06F 3/1293
358/1.13
(Continued)

FOREIGN PATENT DOCUMENTS

EP          886206     *  5/1998
EP          886206     * 12/1998
(Continued)

OTHER PUBLICATIONS

U.S. Appl. No. 13/749,341, filed Jul. 24, 2014, Pizot et al.
(Continued)

*Primary Examiner* — Ibrahim Siddo
(74) *Attorney, Agent, or Firm* — HP Inc. Patent Department (57) ABSTRACT

A combination of physical and logical components of an apparatus to establish a persistent connection over a network with a source that is provided with or part of a job service. The components extract a job instruction embodied in a first communication that is received from the source over the persistent connection, without the apparatus having provided a request for the first communication. Based on the job instruction, the components send a request to the job service for job data when the job service is able to process job data for a corresponding job, without the apparatus polling the job service or waiting for the job service to receive the corresponding job.

21 Claims, 5 Drawing Sheets

(51) Int. Cl.
*H04L 29/06* (2006.01)
*G06F 9/54* (2006.01)

(52) U.S. Cl.
CPC .......... *G06F 9/547* (2013.01); *H04L 67/2823* (2013.01); *H04L 69/08* (2013.01); *G06F 3/1265* (2013.01); *G06F 3/1288* (2013.01)

(56) References Cited

U.S. PATENT DOCUMENTS

| | | | |
|---|---|---|---|
| 6,564,337 | B1 | 5/2003 | Yoneda et al. |
| 6,757,741 | B1 | 6/2004 | Hertling |
| 7,111,060 | B2 | 9/2006 | Araujo et al. |
| 7,386,738 | B2 | 6/2008 | Trappeniers et al. |
| 7,730,339 | B2 | 6/2010 | Wang |
| 7,870,044 | B2 | 1/2011 | Robertson |
| 8,019,829 | B2 | 9/2011 | Cocotis et al. |
| 8,223,355 | B2 | 7/2012 | McCoog et al. |
| 8,363,247 | B2 | 1/2013 | Butcher |
| 2001/0029531 | A1 | 10/2001 | Ohta |
| 2002/0046238 | A1 | 4/2002 | Estavillo et al. |
| 2002/0075506 | A1* | 6/2002 | Stevenson .............. G06K 15/00 358/1.15 |
| 2002/0103853 | A1 | 8/2002 | Copp et al. |
| 2002/0131082 | A1 | 9/2002 | Al-Varez-Baron Stoof |
| 2002/0181010 | A1 | 12/2002 | Pineau |
| 2003/0078965 | A1* | 4/2003 | Cocotis .................. H04L 29/06 709/203 |
| 2004/0185882 | A1 | 9/2004 | Gecht et al. |
| 2005/0052694 | A1 | 3/2005 | Asano |
| 2005/0105127 | A1 | 5/2005 | Miwa et al. |
| 2005/0162685 | A1 | 7/2005 | Heiles et al. |
| 2005/0219612 | A1 | 10/2005 | Nakagawa |
| 2005/0240994 | A1* | 10/2005 | Burcham ............ H04L 63/0209 726/15 |
| 2005/0273496 | A1 | 12/2005 | Jean et al. |
| 2006/0176504 | A1 | 8/2006 | Burke et al. |
| 2006/0250642 | A1 | 11/2006 | Trappe et al. |
| 2007/0016680 | A1 | 1/2007 | Burd et al. |
| 2007/0268518 | A1 | 11/2007 | Yokoyama |
| 2008/0144090 | A1* | 6/2008 | Kimura .............. H04N 1/00204 358/1.15 |
| 2008/0298268 | A1* | 12/2008 | Chiba .................... H04H 60/27 370/252 |
| 2009/0011708 | A1 | 1/2009 | Kim et al. |
| 2009/0109843 | A1* | 4/2009 | Yang ...................... H04L 12/66 370/225 |
| 2010/0211698 | A1 | 8/2010 | Krishnaswamy |
| 2010/0274848 | A1 | 10/2010 | Altmaier et al. |
| 2011/0022812 | A1 | 1/2011 | van der Linden et al. |
| 2011/0173324 | A1 | 7/2011 | Wang et al. |
| 2011/0235508 | A1 | 9/2011 | Goel et al. |
| 2013/0010333 | A1 | 1/2013 | Anand et al. |
| 2013/0060942 | A1 | 3/2013 | Ansari et al. |
| 2013/0103844 | A1 | 4/2013 | Bulut et al. |
| 2013/0111038 | A1 | 5/2013 | Girard |

FOREIGN PATENT DOCUMENTS

| | | |
|---|---|---|
| JP | 2007048031 A | 2/2007 |
| WO | WO-2010031310 | 3/2010 |

OTHER PUBLICATIONS

Breuer, S. et al., UniFLOW, (Research Paper), Sep. 15, 2010, http://www.nt-ware.com/mom/5.0/eng/momuserdoc_en.pdf.

Extended European Search Report received in EP case 10849584.7, dated Feb. 21, 2014, 5 pages.

International Preliminary Report on Patentability received in PCT Application No. PCT/US2010/030220, dated Oct. 18, 2012, 6 pages.

International Search Report & Written Opinion received in PCT Application No. PCT/US2010/030220, dated Dec. 10, 2010, 3 pages.

K. Egevang, "The IP Network Address Translator (NAT) RFC 1631," IETF Network Working Group, May 1994, 8 pages.

Perez, S., "HP's CloudPrint Coming to BlackBerry," ReadWrite, May 4, 2009, 4 pages, found at http://readwrite.com/2009/05/04/hps_cloudprint_coming_to_blackberry.

Rosenberg et al., "Session Traversal Utilities for NAT (STUN)," Network Working Group, RFC 5389, Oct. 2008, 36 pages, found at http://tools.ietf.org/html/rfc5387.

Wikipedia, "XMPP," XP002720778, Mar. 27, 2010, pp. 1-7, Retrieved from the Internet: http://en.wikipedia.org/w/index.php?title=XMPP&oldid=352338507.

Wikipedia, "Polling (computer science)," Mar. 12, 2010, 1 page, found at http://web.archive.org/web/20100312231959/http://en.wikipedia.org/wiki/Polling_(compute.

XMPP Standards Foundation, "XMPP Technologies: Overview," Dec. 16, 2009, 1 page, found at http://web.archive.org/web/20091216030050/http://xmpp.org/tech/overview.shtml.

\* cited by examiner

DEVICE MESSAGING FOR PROCESSING JOBS OVER A NETWORK

CROSS-REFERENCE TO RELATED APPLICATIONS

This application is a Continuation of U.S. patent application Ser. No. 13/636,361, filed Sep. 21, 2012, entitled "DEVICE MESSAGING", which is a 371 National Stage entry of International Patent Application No. PCT/US2010/030220, filed Apr. 7, 2010, entitled "DEVICE MESSAGING"; the aforementioned applications are hereby incorporated by reference in their entirety.

BACKGROUND

Jobs can be delivered to devices such as printers via a data network. In particular, a user delivers a document to a network service. The network service formats the document generating a job that is to be delivered to a particular network enabled device. Firewalls and other security measures prevent a network service from initiating the delivery of a job. However, since the device has no inherent knowledge of when a job is available, the device does not know how or when to request a job, so the device first inquires as to whether a job is ready.

The device may use polling or "hanging get" techniques to learn if a job is ready to be delivered. When polling, the device periodically sends a request to the network device to learn if a job is available, and the server responds. That response either indicates no job is available or, if available, the job is returned in the response. With "hanging get," the device sends a request to the network service. The service holds on to the request keeping the session open and responds only when a job is available. Or, if too much time elapses, the session times out forcing the device to send another hanging get request.

The polling approach consumes network bandwidth and network service resources when requests are made and no job is available. The bandwidth consumption becomes problematic when polling is implemented on a large scale, that is, when multiple device are polling the network simultaneously. Furthermore, polling results in a job delivery lag. In other words, a job is not delivered until the device sends its next scheduled polling request. The "hanging get' approach consumes resources of the network service especially when multiple devices are competing for those resources. In particular, the network service maintains a session or thread for each hanging get request.

DETAILED DESCRIPTION

Introduction

Various embodiments described below were developed in an effort to notify a device that job is available at a network service. In particular, the embodiments were developed to overcome disadvantages of techniques such as polling and "hanging get." Overcoming such disadvantages allow a network service to deliver jobs to devices on a larger scale than otherwise possible.

A "network service" refers to a server or collection of servers that are configured to communicate with a collection of devices to fulfill intended purposes. Such purposes include selectively communicating messages and jobs to the devices. The term "job" is used to refer to data that can be processed by a device to produce a desired result. A job may cause the device to identify and communicate state information. Such information can include the device's physical location, its current operational status, and even usage statistics. Where the device is a printer, a job may cause the device to produce printed output.

A "job instruction" as used herein refers to an instruction designed to cause a device to process a job. The job instruction may include the job itself or a reference, such as an URL, for retrieving the job. A job instruction can include or provide access to parameter settings that affect how the device processes a job. Parameter settings control options such as whether or not certain features are used when processing a job. Where the device is a printer, such features may include color printing, duplex printing, stapling, multiple copies, collating, and the like. When not included with job instruction itself, the parameter settings may instead be retrieved using a reference included in the job instruction. This may be the same reference used to retrieve the job.

The following description is broken into sections. The first, labeled "Environment," describes an exemplary environment in which various embodiments may be implemented. The second section, labeled "Components," describes examples of various physical and logical components for implementing various embodiments. The third section, labeled as "Operation," describes steps taken to implement various embodiments.

Figure 1:
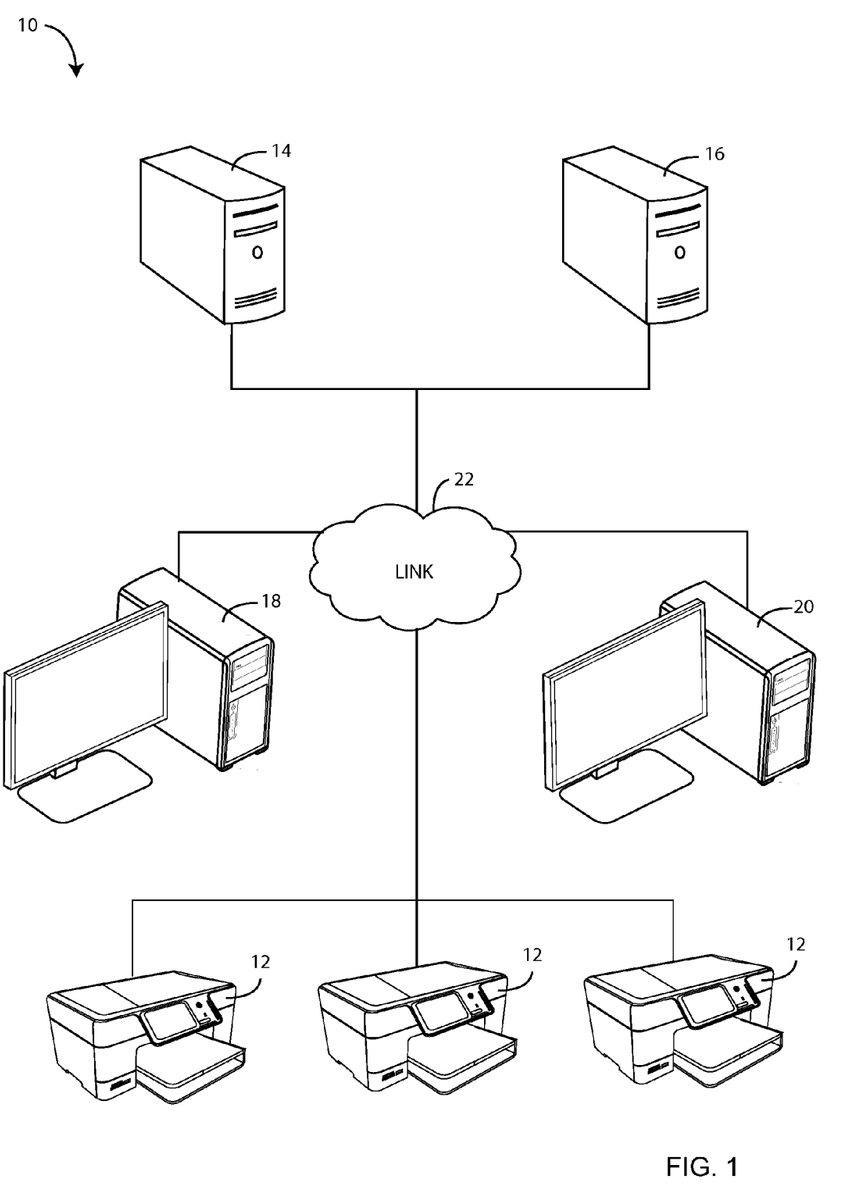
FIG. 1 depicts an exemplary environment in which various embodiments may be implemented.

Environment:

FIG. 1 depicts an exemplary network 10 in which various embodiments may be implemented. Network 10 is shown to include devices 12, job service 14, messaging service 16, and clients 18 and 20. Devices 12 represent generally any devices capable of processing jobs received from job service 14. In the example of FIG. 1, devices 12 are shown as printers configured to produce printed output from print jobs. Job service 14 represents a network service configured to work with messaging service 16 to deliver jobs to devices 12. Messaging service 16 represents a network service configured to communicate messages to and receive messages from devices 12 for the purpose of enabling job delivery by job service 14.

Clients 18 and 20 each represent a computing device configured to interact with and direct job service 14 to cause a job to be delivered to a selected device 12. In an implementation discussed in more detail below, devices 12 are printers and client devices 16 and 18 are configured to instruct job service 14 to cause print jobs to be delivered. While network 10 is shown to include three printers 12, two clients 16 and 18, and two services 14 and 16, network 10 may include any number of such components. Furthermore, while services 14 and 16 are depicted as being distinct, services 14 and 16 may instead be implemented in a more integrated fashion. For example, job service 14 and messaging service may represent a common server or collection of servers configured to implement the specified functions.

Components 12-20 are interconnected via link 22. Link 22 represents generally one or more of a cable, wireless, fiber optic, or remote connections via a telecommunication link, an infrared link, a radio frequency link, or any other connectors or systems that provide electronic communication. Link 22 may include, at least in part, an intranet, the Internet, or a combination of both. Link 22 may also include intermediate proxies, routers, switches, load balancers, and the like. The paths followed by link 22 between components 12-20 as depicted in FIG. 1 represent the logical communication paths between these devices, not necessarily the physical paths between the devices.

Figure 2:
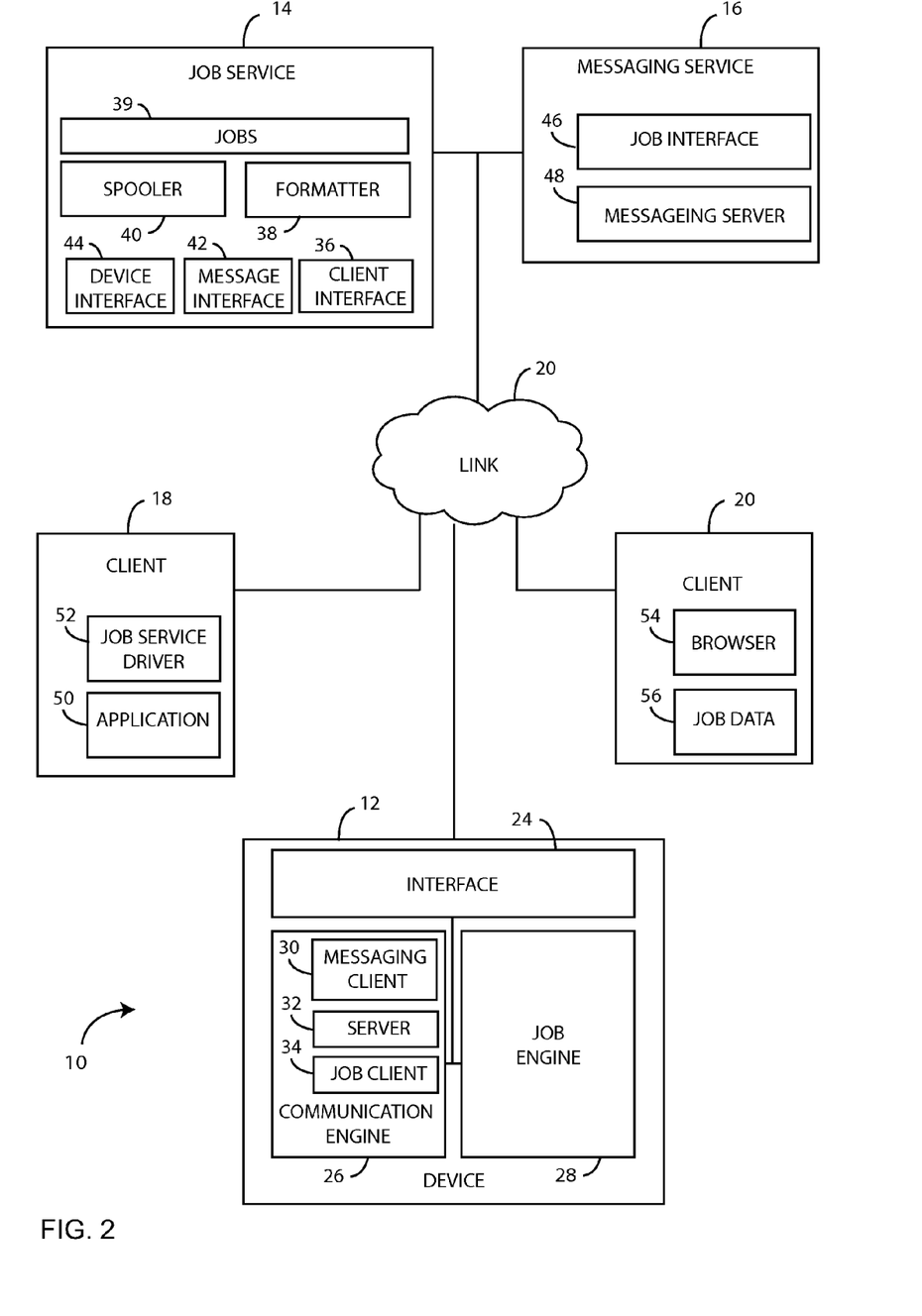
FIG. 2 depicts example and various physical and logical components for implementing various embodiments.

Components:

FIG. 2 depicts various physical and logical components for implementing various exemplary embodiments. In FIG. 2, device 12 is shown to include interface 24, communication engine 26, and job engine 28. Interface 24 represents generally any combination of hardware and programming configured to receive communications from and pass communications to via link 20. In particular, interface 24 may include one or more physical ports such as a wired or wireless network port via which communications may be sent and received on more than one data channel. As discussed below, one such channel may be used for communications of a first protocol such as XMPP (Extensible Messaging and Presence Protocol) and another data channel may be used for communications of a second protocol such as HTTP (Hypertext Transport Protocol).

Communication engine 26 represents generally any combination of hardware and programming configured to process communications received via interface 24 and to generate communications to be sent via interface 24. As addressed in more detail below, communication engine 26 is responsible for processing and generating communications of different types received and sent on different data channels using different protocols. In particular, through those communications, communication engine 26 is operable to retrieve and pass a job to job engine 28. Job engine 28 represents generally any combination of hardware and programming configured to process a job received from communication engine 26 to achieve an intended result. For example, where device 12 is a printer and the job is a print job, job engine 28 is responsible for processing the print job to produce printed output. In this example, job engine 28 would include components to deposit imaging material such as ink or toner onto a media sheet.

In FIG. 2, communication engine 26 is shown to include messaging client 30, server 32, and job client 34. Messaging client 30 represents generally any combination of hardware and programming configured to communicate with messaging service 16 using a first protocol. In particular, messaging client 30 receives, utilizing the first protocol, a first communication from messaging service 16, extracts a request from the communication, and sends, utilizing a second protocol, the request to server 32. The request includes a job instruction to be processed by server 32. As noted above that first protocol may be XMPP while the second protocol is HTTP. Messaging client 34 is configured to receive the first communication without having first requested it. Messaging client 34 is also configured to send, utilizing the first protocol, a second communication to messaging service 16—the source of the first communication. That second communication includes a response received from server 32 and is a response to the request extracted from the first communication.

Server 32 represents generally any combination of hardware and programming configured to receive the request from messaging client 30, process the request, and return a response to messaging client 30 using the second protocol. In processing the request, server 32 forwards the job instruction included in the request to job client 34. To generate the response, server 32 may communicate with job engine 28 or job client 34 to obtain information related to the state of job engine 28. Where device 12 is a printer, such state information can include consumable levels and usage, successful receipt of a job instruction, successful completion of a print, and any other information relative to the state of job engine 28. Server 32 can then include the state information in the response.

Job client 34 represents generally any combination of hardware and programming configured to process a job instruction received from server 32. A job instruction, for example, may be or include a reference such as an URL (Uniform Resource Locator) for use in retrieving a job from job service 14. In such a case, job client 34 is responsible for using the reference to send a communication utilizing via interface 24 utilizing the second protocol, HTTP in the above example. That communication includes a request to retrieve a job identified by the reference from job service 14. In response to that request, job client 34 receives the job and passes it to job engine 28 for processing. Where the job is a print job, job engine 28 produces printed output. The job instruction may also include parameter settings. Here, job client 34 passes those setting to job engine 28 for use in processing the job.

Messaging client 30 communicates with messaging service 16 via the first protocol with communications passing over a first data cannel. Job client 34 communicates with job service 14 via a second protocol with communications passing over a second, different data channel. The first and second protocols are different in that an external communication (a communication form messaging service 16) can be sent to messaging client 30 without messaging client 30 having first requested that communication. A protocol such as XMPP can serve as the first protocol. On the other hand, an external communication sent from job service 14 to job client 34 is first requested by job client 34. Thus, HTTP can serve as the second protocol.

In a given implementation, a job may be included in a job instruction. In this case, job client 34 may not communicate with job service 14 directly, but instead extract the job from the job instruction and forwarding the job on to job engine 28. Where, for example, device 12 is a printer, the extracted job can be a print job processed to produce printed output.

Job service 14 is shown to include client interface 36, formatter 38, jobs 39, spooler 40, message interface 42, and device interface 44. Client interface 36 represents generally any combination of hardware and programming configured to receive data from clients 18 and 20. In general, this data is related to a job that is to be delivered to device 12. Where device 12 is a printer, the data includes a document. Formatter 38 represents generally any combination of hardware and programming configured to process the data received from clients 18 and 20 to generate jobs 39. Where device 12 is a printer, formatter 38 formats the data to create print jobs. Such may include formatting into a format compatible for printing by device 12 or digital archiving for later access and printing. Exemplary formats include Post Script, PDL (Page Description Language), and PDF (Portable Document Format).

Spooler 40 represents generally any combination of hardware and programming configured to act as a queue for jobs 39 and to release jobs 39 when requested by device 12. Message interface 42 represents generally any combination of hardware and programming configured to notify messaging service 16 when a job is ready to be delivered. That notification includes a reference for requesting the job and it also identifies device 12. In particular, the notification can take the form of a request, an HTTP request to be issued to server 32. Message interface is also responsible for receiving responses to such requests from messaging service 16. Device interface 44 represents generally any combination of hardware and programming configured to receive requests from job client 34. The request includes a reference such as an URL. Device interface 44 then works with spooler 40 to return a job identified by the reference.

Messaging service 16 is shown to include job interface 46 and messaging server 48. Job interface represents generally any combination of hardware and programming configured to receive requests from and return responses to message interface 42. Messaging server 48 any combination of hardware and programming configured to send communications to and receive communications from messaging client 30. As noted, those communications are of a first protocol that allows messaging server to send a communication to messaging client 30 without having first received a request for the communication.

Communications sent to messaging client 30 include requests received from job service 14. As noted, such requests can include a job instruction that in turn can include a reference for retrieving a job held by spooler 40. In particular, messaging server 48 wraps the request in a communication and sends that communication to device 12 where it is received by messaging client 30. Such may, for example, be accomplished by wrapping the request in an XMPP message. Messaging server 48 is also responsible for receiving communications back from messaging client 30. A received communications may, for example, be a response wrapped in an XMPP message. That response would be a response to a request included in an XMPP message previously delivered to device 12.

Client 18 is shown to include application 50, job service driver 52, and network interface 54. Application 50 and job service driver 52 operate in conjunction to create and deliver job data to job service 14 for use by job service 14 to create a job to be delivered to device 12. Client 20 is shown to include browser 54 and job data 56. Here browser 54, with or without the aid of an extension, functions to upload job data 56 to job service 14. Where device 12 is a printer such job data may include a document to be formatted by job service 14 into a print job and then delivered to device 12 to be printed.

In foregoing discussion, various components were described as combinations of hardware and programming. Such components may be implemented in a number of fashions. In one example, the programming may be processor executable instructions stored on tangible memory media and the hardware may include a processor for executing those instructions. Thus, certain elements operating on the same device may share a common processor and common memory media.

Figure 3:
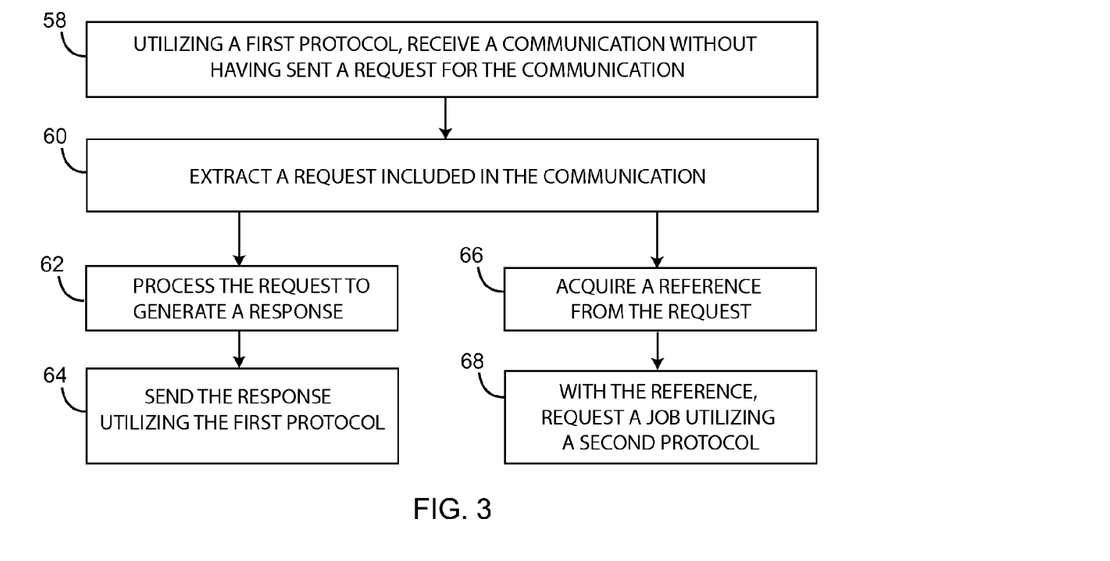
FIGS. 3-7 are exemplary flow diagrams depicting steps taken to implement various embodiments.
Figure 4:
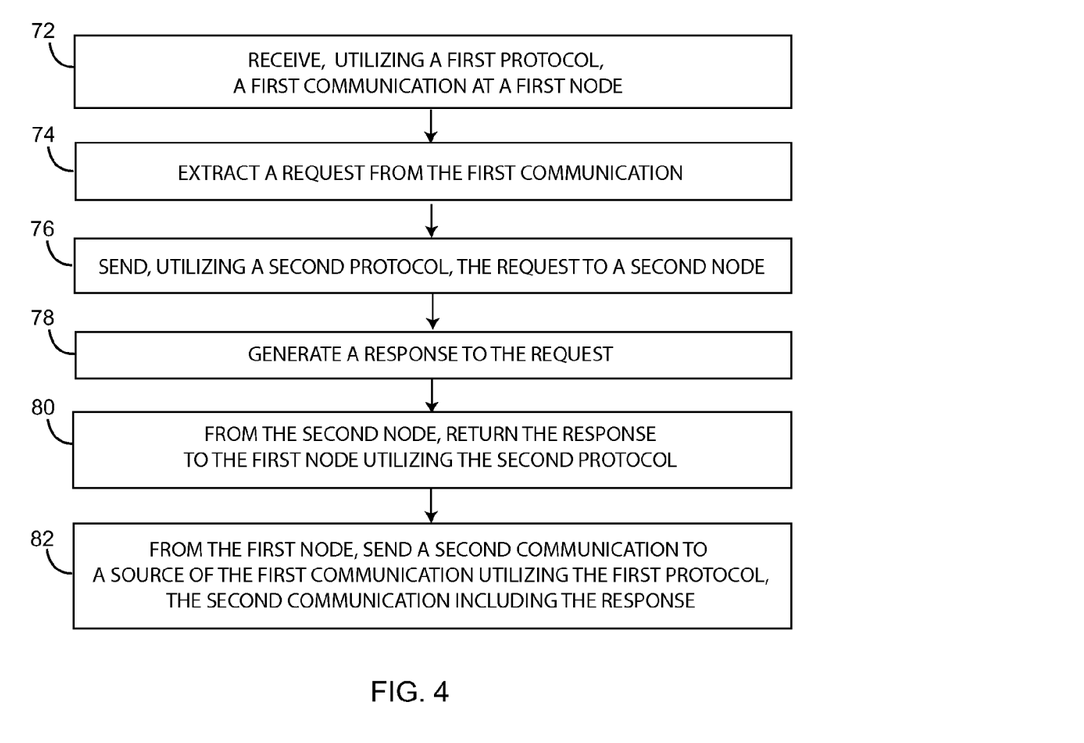
Figure 5:
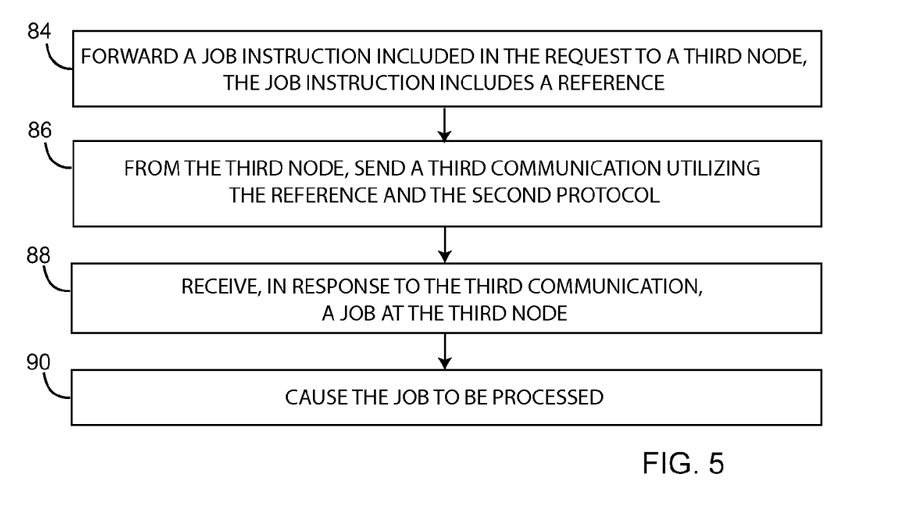
Figure 6:
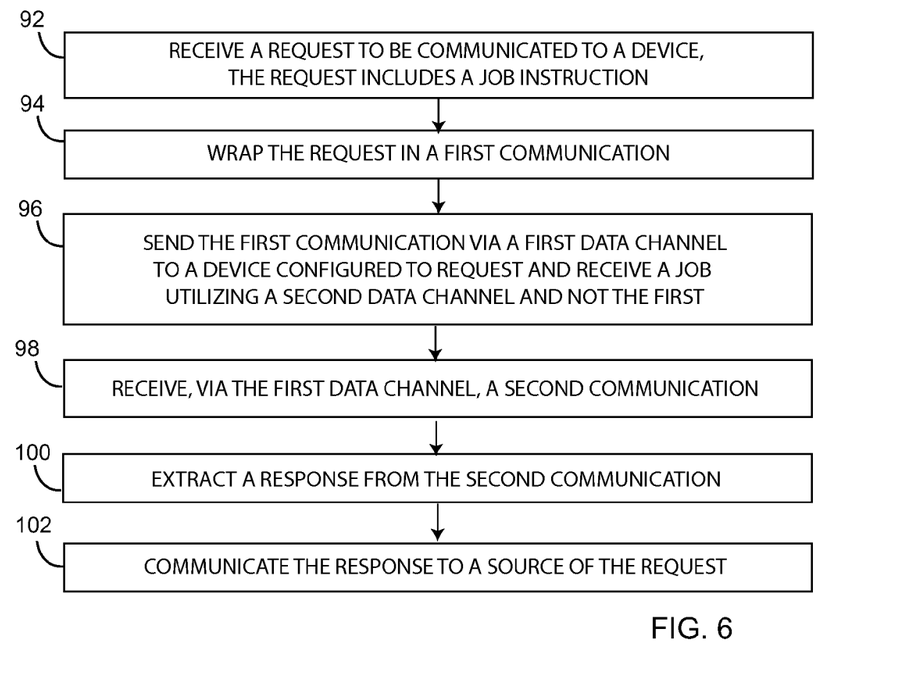
Figure 7:
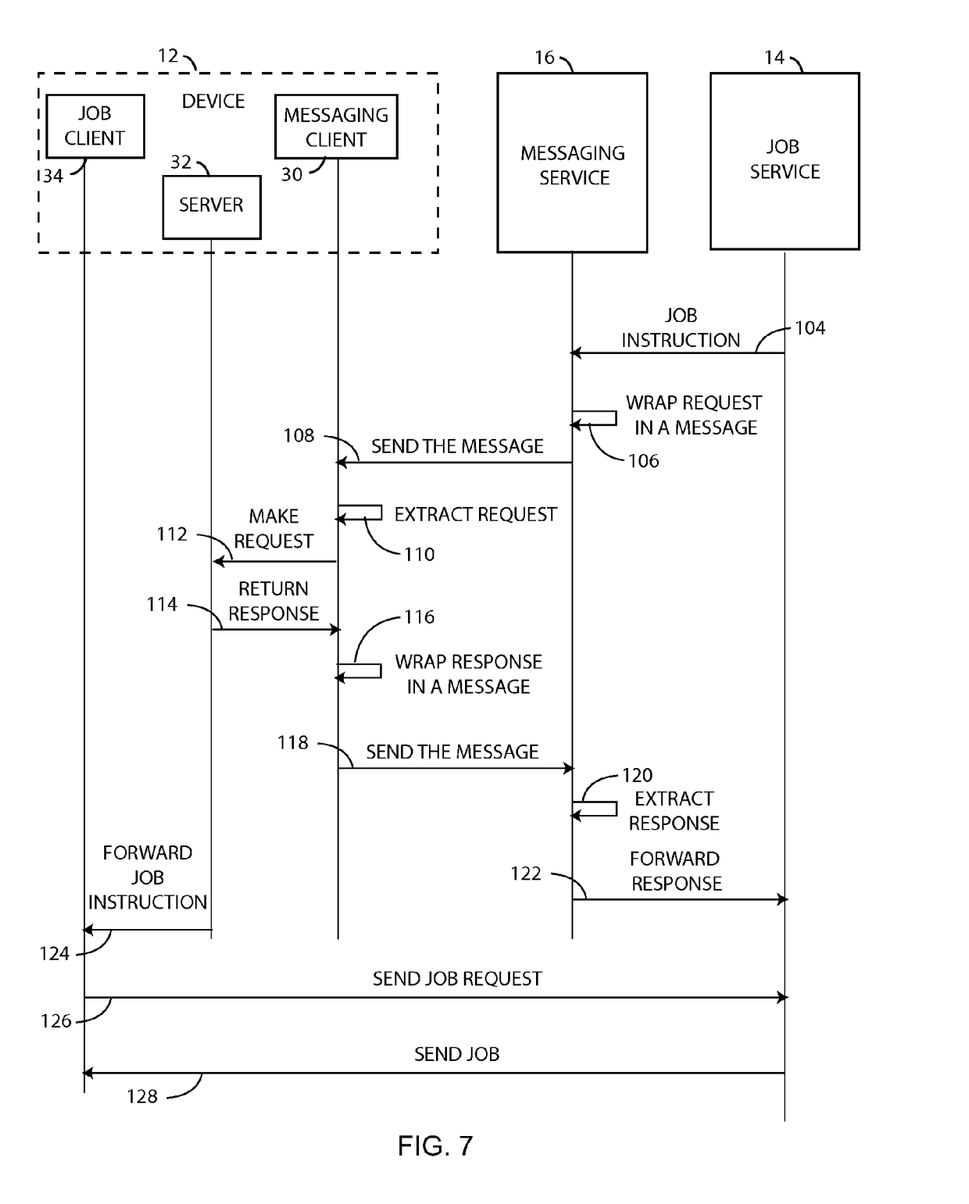

Operation:

FIGS. 3-7 are exemplary flow diagrams of steps taken to implement various embodiments. In discussing FIGS. 3-7, reference may be made to the diagrams of FIGS. 1-2 to provide contextual examples. Implementation, however, is not limited to those examples. FIGS. 3-4, and 5 depict a workflow from the perspective of a device (such as device 12). FIG. 6 depicts steps taken from the perspective of network service such as messaging service 14. FIG. 7 depicts a workflow from a system wide perspective.

Starting with FIG. 3, a communication is received utilizing a first protocol (step 58). That communication is received at the device without the device having first requested the communication. A request is encoded in the communication. For example, the communication may be an XMPP message wrapping the request. The request is extracted from the communication (step 60). Referring to FIG. 2, the communication of step 58 is received at device 12 by messaging client 30. Messaging client 30 is also responsible for extracting the request in step 60.

Following step 60, the process can, if appropriate, split into two threads. The first thread includes steps 62 and 64 while the second thread includes steps 66 and 68. In the first thread, the request extracted in step 60 is processed to generate a response (step 62). Utilizing the first protocol, that response is returned to a source of the communication received in step 58. Referring to FIG. 2, server 32 is responsible for processing the request and generating the response in step 62, while messaging client 30 is responsible for sending the response in step 64.

In a further example, the request extracted in step 60 can include a request for state information. Thus, step 62 would include generating a response that includes the requested state information. Referring to FIG. 2, in generating the response, server 32 communicates with job engine 28 to obtain the state information. Where device 12 is a printer, such state information may include consumable levels and usage and the status of a particular print job or jobs being processed by job engine 28.

Moving to the second thread, a reference, if present, is acquired from the request extracted in step 60 (step 66). As noted, the reference may be an URL identifying a network location from which a job may be retrieved. With the reference, a job is requested utilizing a second protocol (step 68). The second protocol is different than the first protocol utilized in steps 58 and 64. As noted above, the second protocol may be HTTP. Referring to FIG. 2, server 32 is responsible for acquiring the reference in step 66 while job client 34 is responsible for using the reference to request the job in step 68.

FIG. 4 depicts an exemplary expansion of steps 58-64 of FIG. 3, while FIG. 5 expands on steps 66 and 68. Referring first to FIG. 4, utilizing a first protocol, a first communication is received at a first node (step 72). A request is extracted from the first communication (step 74). That request is sent to a second node utilizing a second protocol (step 76). Referring to FIG. 2, messaging client 30 functions as the first node, extracts the request, and sends the response to server 32 which acts as the second node. Again, the first protocol allows the request to be received without having first been requested. XMPP is such a protocol. The second protocol may be HTTP.

A response to the request is generated (step 78). From the second node, the response is returned to the first node utilizing the second protocol (step 80). From the first node, a second communication is sent to a source of the first communication utilizing the first protocol (step 82). Referring to FIG. 2, server 32 functions as the second node and is responsible for steps 78 and 80. Messaging client 30 serves as the first node and is responsible for step 80. In particular, messaging client 30 wraps the response in the second communication, which, as noted, may be an XMPP message.

The request sent to the second node in step 76 may include a request for state information. Thus, step 78 would include generating a response that includes the requested state information. Referring to FIG. 2, in generating the response, server 32 communicates with job engine 28 to obtain the state information. Where device 12 is a printer, such state information may include consumable levels and usage and the status of a particular print job or jobs being processed by job engine 28.

The request sent to the second node in step 76 may include a job instruction. As noted a job instruction can include one or both of a reference and parameter settings for guiding device operation. Moving to FIG. 5, the job instruction is forwarded to a third node (step 84). From the third node, a third communication is sent utilizing a reference from the job instruction and the second protocol (step 86). Referring to FIG. 2, job client 34 functions as the third node and uses the reference to request the job. In the example FIG. 2, the reference may be an URL via which job client 34 can retrieve a job from job service 14 using an HTTP request. In response to the third communication, a job is received (step 88). The received job is a job identified by the reference. The job is caused to be processed (step 90). Referring to FIG. 2, job client 34 is responsible for steps 88 and 90. For example, where device 12 is a printer, job client 34 receives the print job from job service 14 and passes the print job to job engine 28 causing job engine to process the print job. As discussed above, the job may be included as part of the job instruction. In such a case, the job is extracted following step 84 and then caused to be processed in step 90 skipping steps 86 and 88.

In addition to the reference, the job instruction forwarded in step 84 may include parameter settings. Were, for example, device 12 is a printer, such parameter settings may be printer settings that control options such as whether or not certain features are used. Such features may include color printing, duplex printing, stapling, multiple copies, collating, and the like. Still referring to FIG. 2, job client 34 may be responsible for passing those parameter settings to job engine 28 so that the job caused to be processed in step 90 is processed using those parameter settings.

FIG. 6, as noted, depicts steps taken from the perspective of a network service such as messaging service 14 of FIGS. 1 and 2. In FIG. 6, a request to be communicated to a device is received (step 92). That request includes a job instruction. In the example of FIG. 2, messaging service 16 receives the request is received from job service 14. The request is wrapped in a first communication (step 94). In the examples above, that first communication may be an XMPP message. The first communication is sent to a device via a first data channel (step 96). That device is configured to request and receive a job referenced in the request via a second data channel different than the first. The first communication is sent without first having received a request for the first communication or the job instruction.

A second communication is received from the device via the first data channel (step 98). A response is extracted from the second communication (step 100). The response is communicated to a source of the request received in step 92 (step 102). Referring to FIG. 2 messaging service 16 receives the second communication and extracts the response in steps 98 and 100. Messaging service 16 then returns the response to job service 14.

Referring to FIG. 2, where device 12 is a printer, the printer's internal server is the intended recipient of the request wrapped in the first communication. The request can include a job instruction that in turn includes one or both of a reference for retrieving a print job and print parameter settings for device 12. The device can use the reference to retrieve a job from print service 14 using the reference and adjust parameters using the supplied settings. The request may also include a request for state information. The device can obtain the requested state information and generate an appropriate response to be communicated in step 102. Such state information can include printer consumable levels and usage as well as the status of one or more print jobs.

Communications on the first data channel are sent and received utilizing a first protocol while communications on the second data channel are sent and received using a second protocol. The first protocol, as noted above, may be XMPP while the second protocol may be HTTP. Referring to FIG. 2, messaging service 16 uses that first data channel to, in effect, notify device 12 that a job is ready to be retrieved from job service 14. Device 12 then utilizes the second data channel to retrieve the job from job service 14. Beneficially, messaging service 16 can send the first communication without waiting for a request from device 12.

FIG. 7 depicts a workflow from a system wide perspective. That system includes job service 14, messaging service 16, messaging client 30, server 32, and job client 34. It is noted that components 30, 32, and 34 are components of device 12. In the example of FIG. 7, messaging service 16 functions as an XMPP server while messaging client is an XMPP client. Further, server 32 functions as an LEDM (Low End data Model) REST (Representational State Transfer) interface. Messaging client 30 can establish a persistent XMPP connection with messaging service 16. Via this connection, device 12 can be notified that a job is available for retrieval from job service 14. Additionally, device 12 can quickly provide print service 14 with job status information.

In an exemplary embodiment, messaging client 30 implements XMPP core-stack (RFC 3920, 3921) and IBB (In-Band Binary) protocol (XEP 0047). Messaging service 16 hosts XMPP server clusters with which device 12 and other like devices communicate. Each node in the XMPP server cluster hosts an internal component with which device 12 or another device communicates using XMPP messages. The content of the XMPP messages communicated between device 12 and messaging server 16 are LEDM REST requests and responses which allow device 12 and print service 14 conform to a common contract of communication.

When device 12 is powered on for the first time, it prompts a user to enable communication with print service 14. If the user agrees, device 12 registers itself with messaging service 16 using, for example, a REST API (Application Program Interface) over TLS (Transport Security Layer). Messaging service 16 creates an XMPP account for device 12 and assigns a new client-id and a password to device 12. Messaging service 16 also provides connection details like the host name and client-id for messaging service 16 and a list of ports along with their priority. Messaging client 30 may maintain an XMPP roster or "buddy list." The roster may be kept empty to avoid overhead involved with communicating presence information.

Device 12 tries to connect to messaging service 16 on its default port, 5222 for example. In case the connection is not successful, possibly because of firewall restrictions, it retries using fallback ports such as 5223, 80 and 443 in order of priority. If the connection is successful, messaging client 30 logs in to messaging service 16 using its client-id and password received during registration. All XMPP communications may happen over TLS between the messaging client 30 and messaging service 16 to help ensure data integrity and to hide sensitive or personal information.

On successful login, device 12 is deemed ready to accept jobs from job service 14. Note that device 12 creates only one TCP (Transmission Control Protocol) connection with messaging service 16 and multiple IBB sessions to send and receive messages in parallel over the TCP connection. One IBB session can be used for LEDM requests and responses and another can be used by device 12 to send job and device events to messaging service 16. This separation allows different types of messages to be served by different components of messaging service 16.

In the following discussion, device 12 is a printer and job service 14 is responsible for delivering print jobs. Initially a user uploads a document and any parameter settings to job service 14. Job service 16 renders the document into a print job for printer 12. The print job conforms to a particular format such as PCL (Printer Control Language) designed for printer 12. The print job is now ready to be sent to device 12 along with any parameter settings.

Job service 14 communicates a job instruction to messaging service (step 104). Step 104, in this example, is accomplished by communicating an LEDM REST request using HTTP. That request includes the job instruction. The job instruction includes an URL for retrieving the print job and any parameter settings. Messaging service 16 wraps the LEDM REST request in an XMPP message (step 106) and sends the XMPP message to messaging client 30 (step 108).

Messaging client 30 extracts the LEDM REST request from the XMPP message (step 110). Messaging client 30 then makes an HTTP request of server 32 using the extracted LEDM REST request (step 112). Server 32 processes the LEDM REST request and returns an HTTP response (step 114). As noted above, where the LEDM REST request includes a request for state information, the response can include the requested state information. Messaging client 30 receives and wraps the response in an XMPP message (step 116) and sends the XMPP message to messaging service (step 118). Messaging service 16 extracts the response from the XMPP message sent in step 118 (step 120) and forwards the response to job service 14.

The request made of server 32 in step 112 includes the job instruction. Server 32 forwards the job instruction to job client 34. Job client 34 uses the URL included in the job instruction to make an HTTP request for the print job from job service 14 (step 126). In response, job service 14 returns the print job in an HTTP response (step 128). Job client 34 then causes device 12 to produce the print job using any parameter settings included in the job instruction.

All LEDM REST requests and responses are communicated via XMPP messages via an XMPP channel. Each XMPP message is sent without first receiving a request for the message or its contents. Print job data is not sent on this channel. Instead, as noted, the print jobs are communicated via an HTTP channel as a response to an HTTP request. The communication on the XMPP channel is kept very light which allows each XMPP server cluster (within messaging service 16) to handle thousands of printers or more.

CONCLUSION

The diagrams of FIGS. 1-2 show the architecture, functionality, and operation of various embodiments. Various components illustrated in FIG. 2 are defined at least in part as programs. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIG. 3-7 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. An apparatus comprising:
   a combination of physical and logical components to:
      establish a persistent connection over a network with a messaging service that is provided with or as part of a job service, wherein communication over the persistent connection occurs under a first communication protocol in which communication requests are not required;
      receive a notification over the persistent connection at a first client in the apparatus, wherein a job instruction is encoded in the notification;
      extract the job instruction from the notification;
      send the extracted job instruction from the first client to a server in the apparatus under a second communication protocol requiring request-based communications;
      forward the extracted job instruction from the server to a second client in the apparatus;
      under the second communication protocol, send a request from the second client to the job service for job data identified in the extracted job instruction;
      receive the job data from the job service at the second client; and
      process the received job data to produce an output.

2. The apparatus of claim 1, wherein the first communication protocol provides for the apparatus to receive the notification without having first requested the notification, and wherein the job data is provided under a second communication protocol which provides for client and server type communications.

3. The apparatus of claim 2, wherein the first communication protocol is XMPP (Extensible Messaging and Presence Protocol) and the second communication protocol is HTTP (Hypertext Transport Protocol).

4. The apparatus of claim 1, wherein the job instruction includes a Uniform Resource Locator (URL).

5. The apparatus of claim 1, wherein the persistent connection is established across a firewall that protects the apparatus.

6. The apparatus of claim 1, wherein the apparatus is a printer.

7. The apparatus of claim 1, wherein the job instruction further includes parameter settings, such as color printing, duplex printing, stapling, multiple copies and collating, among others.

8. The apparatus of claim 1, wherein the notification further includes identifying the apparatus.

9. The apparatus of claim 8, wherein the notification is wrapped in the first communication protocol when extracted, and wherein the request is wrapped in the second communication protocol when sent.

10. The apparatus of claim 1, wherein the communication over the persistent connection under a first communication protocol pass over a first data channel, and wherein the request for job data under the second data protocol pass over a second data channel different from the first data channel.

11. A method for operating an apparatus to process job data over a network, the method being implemented by one or more processors of the apparatus and comprising:
    establishing a persistent connection over the network with a messaging service that is provided with or as part of a job service, wherein communication over the persistent connection occurs under a first communication protocol in which communication requests are not required;
    receiving a notification over the persistent connection at a first client in the apparatus, wherein a job instruction is encoded in the notification;
    extracting the job instruction from the notification;
    sending the extracted job instruction from the first client to a server in the apparatus under a second communication protocol requiring request-based communications;
    forwarding the extracted job instruction from the server to a second client in the apparatus;
    under the second communication protocol, sending a request from the second client to the job service for job data identified in the extracted job instruction;
    receiving the job data from the job service at the second client; and
    processing the received job data to produce an output.

12. The method of claim 11, wherein the first communication protocol provides for receiving the notification without having requested the notification, and wherein the job data is provided under a second communication protocol which provides for client and server type communications.

13. The method of claim 12, wherein the first communication protocol is XMPP (Extensible Messaging and Presence Protocol) and the second communication protocol is HTTP (Hypertext Transport Protocol).

14. The method of claim 11, wherein the job instruction includes a Uniform Resource Locator (URL).

15. The method of claim 11, wherein the persistent connection is established across a firewall that protects the apparatus.

16. The method of claim 11, wherein the apparatus is a printer.

17. The method of claim 11, wherein the job instruction further includes parameter settings, such as color printing, duplex printing, stapling, multiple copies and collating, among others.

18. The method of claim 11, wherein the notification further includes identifying the apparatus.

19. The method of claim 18, wherein the notification is wrapped in the first communication protocol when extracted, and wherein the request is wrapped in the second communication protocol when sent.

20. A system comprising:
    a job service;
    a printer, wherein the printer is to:
        establish a persistent connection over a network with a messaging service that is provided with or part of the job service, wherein communication over the persistent connection occurs under a first communication protocol in which communication requests are not required by the printer;
        receive a notification over the persistent connection at a first client in the printer, wherein a job instruction is encoded in the notification;
        extract the job instruction from the notification;
        send the extracted job instruction from the first client to a server in the printer under a second communication protocol requiring request-based communications;
        forward the extracted job instruction from the server to a second client in the printer;
        under the second communication protocol, send a request from the second client to the job service for job data identified in the extracted job instruction;
        receive the job data from the job service at the second client; and
        process the received job data to produce an output.

21. The system of claim 20, wherein the first communication protocol provides for the printer to receive the notification without having first requested the notification, and wherein the job data is provided under a second communication protocol which provides for client and server type communications.

* * * * *

UNITED STATES PATENT AND TRADEMARK OFFICE
CERTIFICATE OF CORRECTION

PATENT NO. : 9,921,790 B2  
APPLICATION NO. : 14/679936  
DATED : March 20, 2018  
INVENTOR(S) : Pankaj Anand et al.

Page 1 of 1

It is certified that error appears in the above-identified patent and that said Letters Patent is hereby corrected as shown below:

On the Title Page

In the illustrative figure "MESSAGEING" should read -- MESSAGING --.

In the Drawings

In Fig. 2, sheet 2 of 5, reference numeral 48, Line 1, delete "MESSAGEING" and insert -- MESSAGING --, therefor.

Signed and Sealed this  
Nineteenth Day of November, 2019

Andrei Iancu  
*Director of the United States Patent and Trademark Office*